United States Patent Office
3,822,240
Patented July 2, 1974

3,822,240
COATING POWDERS BASED ON ε-CAPROLACTAM-BLOCKED POLYISOCYANATES
Karl Schmitt and Josef Disteldorf, Herne, and Felix Schmitt, Wanne-Eickel, Germany, assignors to Veba-Chemie AG, Gelsenkirchen-Buer, Germany
No Drawing. Filed Feb. 4, 1972, Ser. No. 223,700
Claims priority, application Germany, Feb. 8, 1971, P 21 05 777.2
Int. Cl. C08g 22/10, 22/32
U.S. Cl. 260—77.5 TB                       7 Claims

ABSTRACT OF THE DISCLOSURE

Polyurethane forming coating powders for application by powder coating processes have a grain size of 0.25 mm. or less and include ε-caprolactam blocked polyisocyanates and hydroxyl containing, aromatic polycarboxylic acid based polyesters.

BACKGROUND

The present invention relates to particulate coating masses or powders as well as to a process for their utilization in the production of coatings which yield polyurethanes upon heating.

In the industrial application of varnishes, there has been a tendency for some time to change over from solvent systems to coating powders. The manifold advantages of powders are due on the one hand to the absence of the solvents and the advantages connected therewith such as no vapors and gases injurious to health and no risks of explosion and fire and on the other hand to the more optimal utilization of the varnish binder. This development has been promoted by the introduction of new coating processes. One of the earliest powder coating process, the fluid bed sintering process, was followed by the spray process, the electrostatic powder coating process and, a combination of the fluid bed process and the last mentioned coating process, namely the electrostatic fluid bed process.

Initially powdered thermoplastics such as polyethylene, polyvinyl chloride and polyamides were used. Today epoxy resin powders have major importance as reactive resins in addition to the aforementioned coating polymers. However, commercially available epoxy resin powders exhibit poor flexibility and inadequate weather resistance. These drawbacks can be overcome by the use of polyurethane varnish systems.

As is known, polyurethane coatings are widely used since they are characterized by good mechanical properties, resistance to chemicals, very good abrasion properties and good weather resistance. Pulverulent masses of this type are however not known.

SUMMARY

According to the present invention, it has now been found that polyurethane coatings having all the known advantages of polyurethanes can be obtained using powder coating techniques. The particulate coating powder or mass of the invention has a grain size of 0.25 mm. or less, preferably from about 0.02 to about 0.06 mm., and comprises ε-caprolactam blocked polyisocyanate polyesters, said polyesters being solid below 40° C. and becoming fluid at 150° C.–180° C. forming low viscosity melts. The coating mass may also contain conventional varnish additives, dyes, pigments and the like.

DESCRIPTION

The blocked isocyanates and polyesters are utilized preferably in stoichiometric quantities, i.e. 1 mole of hydroxyl group per mole of isocyanate group. An excessive or insufficient amount of the reactants may however also be used. By an appropriate selection of the ratios of the components the mechanical properties of the coatings can be varied within wide limits.

The blocked aliphatic and/or cycloaliphatic polyisocyanates can be produced both in the melt and in solution by adding the blocking agent to the isocyanate below the splitting temperature of the blocked product. A stoichiometric quantity or a slight excess of the blocking agent is utilized. The addition reaction is exothermic. Following the fading out of the exothermic peak it is however necessary to keep the reaction medium at elevated temperature for a certain period of time in order to continue the reaction to obtain a yield of 99%. By using catalysts, the addition to the blocked isocyanate can be stepped up to yields of 99.5% in the case of stoichiometric substance quantities. Preferably, approximately 99% of the isocyanate groups should be masked, since otherwise, during the subsequent homogenization the entire varnish binder crosslinks and, thus difficultly or no longer meltable components result which prevent the formation of a faultless varnish surface during stoving.

Regarding the consistency, melting point as well as melt viscosity, the same requirements as listed below for the polyesters are valid.

This addition can be accelerated by catalysts of the type of the tertiary amines, e.g. triisobutyl amine, triethylene diamine, and the like.

Aliphatic containing up to 12 carbon atoms (preferred are alkyl and alkenyl with up to 12 carbon atoms) and/or cycloaliphatic containing up to 10 carbon atoms in the ring system, preferably up to 8, more preferably up to 6, and a total of up to 18 carbon atoms (preferred are cycloalkyl and cycloalkenyl with the same carbon atom contents) polyisocyanates are suitable for blocking and utilization in accordance with the present invention. 3-Isocyanatomethyl - 3,5,5 - trimethylcyclohexyl isocyanate, which is also called isophorone diisocyanate, has proven particularly suitable. Another particularly suitable polyisocyanate is the 1,6-hexamethylene diisocyanate. Also suitable are the reaction products of aliphatic and/or cycloaliphatic polyisocyanates with polyols, the quantity ratios of polyisocyanate and polyol being such that the resulting product contains at least 2 isocyanate groups. Suitable polyols are listed below when describing suitable polyesters.

The hydroxyl group containing polyesters, solid below 40° C. and readily flowable at 150° C.–180° C. and forming low viscosity melts, which are used in accordance with the invention, are based primarily on aromatic polycarboxylic acids. The aromatic polycarboxylic acids can be mononuclear (phenyl) or polynuclear (naphthyl, biphenyl, bis-phenyl, etc.) and contain from 6 to 20, preferably 6 to 12, carbon atoms in the ring systems. These acids can be unsubstituted or substituted with substituents such as halo, (F, Cl, Br, I) alkyl, especially alkyl of 1 to 4 carbon atoms, alkoxy and especially alkoxy of 1 to 4 carbon atoms, and the like. Part of the aromatic polycarboxylic acids may also be replaced by aliphatic and/or cycloaliphatic (having the meanings given above for the polyisocyanates including araliphatic such as aralkyl or phenylalkyl) polycarboxylic acids.

Suitable aromatic, aliphatic, and cycloaliphatic polycarboxylic acids, wherein the aromatic polycarboxylic acids may be mononuclear or polynuclear, are for example oxalic acid, succinic acid, adipic acid, sebacic acid, terephthalic acid, methylterephthalic acid, 2,5- and 2,6-dimethylterephthalic acid, chloroterephthalic acid, 2,5 - dichloroterephthalic acid, fluoroterephthalic acid, isophthalic acid, trimellitic acid, naphthalenedicarboxylic acid, in particular the 1,4-, 1,5-, 2,6- and 2,7 - isomers, phenylenediacetic acid, 4 - carboxyphenoxyacetic acid, m- and p - terphenyl - 4,4″ - dicarboxylic acid, dodecahydrodiphenic acid, hexahydroterephthalic acid, 4,4' - diphenic acid, 2,2'- and 3,3' - dimethyl - 4,4' - diphenic acid, 2,2' - dibromo-4,4'-diphenic acid, bis-(4-carboxyphenyl)-methane, 1,1- and 1,2-bis-(4-carboxyphenoxy) - ethane, bis-4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8 - dibenzofuran-dicarboxylic acid, 4,4'-stilbenedicarboxylic acid and octadecahydro-m-terphenyl-4,4''-dicarboxylic acid and the like. Mixture of the aforementioned compounds may also be employed.

To make the hydroxyl group containing polyesters preferably diols are used as alcohol component. Aliphatic and cycloaliphatic polyols are useful herein. Aliphatic and cycloaliphatic have the same meanings for the polyols as previously given for the polyisocyanates. Preferred are alkane and cycloalkane diols and triols containing 2 to 20 carbon atoms, preferably 2 to 12 carbon atoms. It is possible to partially also use other polyols, e.g. triols; examples for suitable compounds are: ethylene glycol, propylene glycol such as 1,2- and 1,3-propane diol, 2,2-dimethylpropane diol-(1,3), butane diols such as butane diol-(1,4), hexane diols such as hexane diol-(1,6), 2,2,4-trimethylhexane diol-(1,6), 2,4,4-trimethylhexane diol-(1,6), heptane diol - (1,7), octadene - 9,10 - diol-(1,12), thiodiglycol, octadecane diol - (1,18), 2,4 - dimethyl - 2-propyl-heptane diol-(1,3), butene diol-(1,4), diethylglycol, triethylglycol, trans-1,4-cyclohexanedimethanol, 1,4-cyclohexane diols, glycerine, hexane triol-(1,2,6), 1,1,1-trimethylol propane, and the like. Mixtures of the aforementioned compounds may also be used.

Other isocyanates useful herein include 2,4-tolylene diisocyanate, 4,4'-diphenylmethane diisocyanate, dianisidine diisocyanate, tolidine diisocyanate, hexamethylene diisocyanate, m-xylylene-diisocyanate, phenyl isocyanate, p-chlorophenyl isocyanate, o-chlorophenyl isocyanate, m-chlorophenyl isocyanate, 3,4-dichlorophenyl isocyanate, 2,5-dichlorophenyl isocyanate, methyl isocyanate, ethyl isocyanate, n-butyl isocyanate, n-propyl isocyanate, octadecyl isocyanate and the like.

When making the polyesters the polyol is utilized in such quantities that more than one OH-group equivalent corresponds to one carboxyl group equivalent.

The hydroxyl group-containing polyesters can be prepared in known and conventional manner. The two processes described below are particularly suitable.

In the first case the starting material is terephthalic acid free from mineral acids, which is to be purified, if necessary, by recrystallization. The ratio of the equivalents of acids to alcohol varies of course in accordance with the desired molecular size and the OH-number to be achieved. After adding 0.005–0.5% by wt., preferably 0.05–0.2% by wt., of a catalyst, e.g. tin compounds such as di-n-butyl tin oxide, di-n-butyl tin diester and the like, or titanium esters, in particular tetraisopropyl titanate, the reaction components are heated in a suitable apparatus while passing through an inert gas, e.g. nitrogen. At approx. 180° C. the first splitting off of water occurs. The water is removed from the reaction mixture by distillation. In the course of several hours the reaction temperature is raised to 240° C. The reaction medium remains inhomogeneous until shortly before the end of the complete esterification. After approx. 24 hrs. the reaction is completed.

In the second process the starting material is terephthalic acid dimethyl ester and reesterification with the desired alcohol components is realized while passing through an inert gas, e.g. nitrogen. As reesterification catalysts titanium esters, dialkyl tin esters or di-n-butyl tin oxide may again be utilized in concentrations of 0.005–0.5% by wt. After reaching approx. 120° C. the first splitting off of methonal occurs. In the course of several hours the temperature is raised to 220–230° C. Depending on the selected batch the reesterification is completed after 2–24 hrs.

In order to avoid a gluing together over a lengthy storage period, the pulverulent coating masses can be subjected to a powderization with suitable agents. In order to be suitable as powderization agent for the coating masses according to the invention, the agent has to be chemically inactive with respect to the components of the coating masses. Suitable powderizing agents are for instance talcum or finely divided silicic acid, which may also contain organic residues, as it is obtained for instance by hydrolysis of methyltrichlorosilane. Also suitable are finely dispersed calcium phosphate and aluminum sulfate as obtained in the decomposition of higher aluminum alcoholates.

As flowing and gloss ameliorants may be used polyvinyl butyrals, mixed polymers of n-butyl acrylate and vinyl isobutyl ether, ketone-aldehyde condensation resins, solid silicone resins or mixtures of zinc soaps of fatty acids and aromatic carboxylic acids.

As heat stabilizers and antioxidants commercially available, sterically hindered polyvalent phenols of high molecular weight have proven successful. Other agents may however be used also.

The quantity of the additives employed depends on each individual case and on the desired properties. A general statement cannot be given on this point.

The solid polyester resin, the blocked isocyanate, the described varnish additives and, if desired, the desired pigment or dye are blended in the melt in an extruder or in a heatable varnish mill or in high-speed mixers at 100° C.–150° C.—but at any rate below the splitting temperature of the blocked isocyanate—to give a homogeneous material. The hardened solid material is then ground in a commercially available mill to a grain size of <0.08 mm. and separated from more coarse parts, if necessary, in a screening apparatus.

The pulverulent masses can be applied to the cleaned shaped bodies to be coated by the aforementioned processes. Subsequently the coated objects are exposed to temperatures that are above the splitting temperature of the blocked polyisocyanate, but below 280° C. The isocyanate released under these conditions reacts with the hydroxyl groups of the polyester to form a polyurethane varnish. Part of the blocking agent evaporates, the other part is incorporated into the varnish film formed.

Upon utilizing the coating masses in accordance with the invention, high-grade, colorless coatings are obtained which are characterized by special light stability.

The systems according to the invention and the preparation of the reactive components are described in the following examples.

EXAMPLE 1 a. Isocyanate Component

As isocyanate component the 3-isocyanatomethyl-3,5,5-trimethylcyclohexyl isocyanate (in short: isophorone diisocyanate) blocked on both sides with ε-caprolactam is utilized, which was prepared as follows:

3 moles (667 g.) of isophorone diisocyanate (IPDI) and 6 moles (678 g.) of ε-caprolactam were slowly heated to approx. 100° C. in a flask while stirring. As a result of the exothermic reaction which occurred the temperature rose temporarily to approx. 140° C. To complete the reaction, the reaction mixture was maintained at between 100° and 120° C. for another 2–3 hrs.

The product had the following chemical and physical values:

Molecular weight _____g./mole__ Approx. 440
Content in free isocyanate
         percent of NCO___ <0.4
Content in blocked isocyanate ____do_____ 18.5
Splitting-up temperature _____° C__ Approx. 175
Melting point _____° C__ 53–55 b. Polyester Component

The polyester used in this example consisted of terephthalic acid, trimethylol propane, and the 1:1 isomeric mixture of the 2,2,4- and 2,4,4-trimethyl hexane diol-(1, 6), and it was prepared as follows:

3 moles (583 g.) of terephthalic acid dimethyl ester, 1.75 moles (280 g.) of trimethylhexane diol-(1,6), 1.75 moles (234 g.) of trimethylol propane and 0.3 g. of tetra-isopropyl titanate were heated to 230° C. within 8 hours. At 120° C. the splitting off of methanol set in. After reaching 230° C., the charge was maintained at this temperature another 10 hrs. to complete the reesterification.

The polyester solid at room temperature had the following chemical and physical data:

OH-number _____ mg. KOH/g__ 160
Acid number _____ do____ <1
Softening interval _____ ° C__ 50–60
Molecular weight _____ 1,400 c. Clear Varnish 100 g. of the described polyester and 66 g. of the isophorone diisocyanate masked with ε-caprolactam were homogenized in the melt by means of a high-speed stirrer at temperatures between 120 and 140° C. After the homogeneous, clear melt solidified, the product was ground in a hammer mill. The fraction <0.08 mm. was separated from the coarser components in a laboratory screening machine. Sample metal sheets were coated with the powder using a laboratory screen and cured in a stoving furnace at temperatures between 180 and 200° C.

d. Pigmented Varnish

By the process described under example 1c a varnish pigmented with titanium oxide was prepared with addition of certain varnish auxiliary agents and was stoved. The pigment/binder ratio was 0.35:1.0. Below only the polyester and the isocyanate used were considered binding agents. The blocking agent was not included in the calculation since it evaporates to a large extent.

Composition 100 g. polyester according to 1b
66 g. masked isophorone diisocyanate according to 1a
46.5 g. white pigment, which is commercially available under the designation Kronos® RN 56 and represents TiO₂, pigment of the rutile type, which has been post-treated with Al and Si compounds.
2.7 g. flowing agent, which is commercially available under the designation Troy Gla® and is a mixture of Zn soaps of fatty acids and aromatic carboxylic acids
0.27 g. oxidation stabilizer, which is commercially available under the designation Irganox 1076® and is a sterically hindered polyvalent phenol of high molecular weight.

e. Mechanical and Chemical Properties of the Varnish Films

Clear Varnish 1c

| Stoving conditions | Mechanical properties | | | | |
|---|---|---|---|---|---|
| | SD | HK | HB | ET | GS |
| 30', 180° C | 60–80 | 206 | 100 | 11.3 | 0 |
| 30', 200° C | 60–80 | 200 | 100 | 10.3 | 0 |

The abbreviations in this and the following tables mean:

SD: layer thickness (in μ)
HK: hardness according to König (according to DIN 53,157)
HB: hardness according to Buchholz (according to DIN 53,153)
ET: cupping (cupping ductility value, deep-drawing) according to Erichsen (according to DIN 53,156)
GS: grating section test (according to DIN 53,151)
GL: measurement of gloss according to Lange (45° C.)

Pigmented Varnish 1d

Stoving Conditions: 30' _____ ° C__ 200

Mechanical Properties:
SD _____ 60–80
HK _____ 181
HB _____ 111
ET _____ 7.2
GS _____ 2
Gl—45° _____ 69

RESISTANCE TO CHEMICALS.—REACTION AFTER THREE DAYS AT ROOM TEMPERATURE

| Reagent | Clear varnish 1c | Pigmented varnish 1d |
|---|---|---|
| 25% H₂SO₄ | Unchanged | Unchanged. |
| 10% NaOH | do | Do. |
| Toluene | Easily reversible swelling | Do. |
| Acetone | Unchanged | Reversible swelling. |
| Methanol | Easily reversible swelling | Slightly swollen. |

EXAMPLE 2 a. Isocyanate Component

The isophorone diisocyanate masked with ε-caprolactam and described in example 1 was utilized as cross-linking agent in this example too.

b. Polyester Component

A polyester was employed that had been built up from terephthalic acid, phthalic acid, trimethylol propane and from the isomeric mixture of 2,2,4- and 2,4,4-trimethyl hexane diol.

Preparation 3 moles (584 g.) of terephthalic acid dimethyl ester, 2.3 moles (308 g.) of trimethylol propane and 2.3 moles (368 g.) of trimethyl hexanediol were heated to approx. 220° C. in 8 hours. 0.05% by wt. of tetraisopropyl titanate were added as reesterification catalyst. During the entire duration of the experiment a nitrogen stream of 20–40 ltrs./hr. provided for an improved removal of the methanol or the water from the reaction mixture. Following completion of the splitting off of methanol, the reaction mixture was cooled to 160° C. and 1 mole (148 g.) of phthalic acid anhydride was added. While slowly raising the temperature to 240° C. approx. 1 mole of water was separated. After approx. another 10 hrs. the polyester resin was finished.

Chemical and physical tests resulted in the following data:

OH-number _____ mg. KOH/g__ 147
Acid number _____ do____ 4.6
Softening interval _____ ° C__ 46–48
Molecular weight _____ 1,620 c. Clear Varnish 100 g. of this polyester, 60.1 g. of isophorone diisocyanate masked on both sides with ε-caprolactam were worked into a powder varnish as described under 1c after adding 1.2 g. of flowing agent Troy Gla® (see also 1d) and 0.3 g. of Irganox® 1076 (see also 1d). If the powder is not to be processed immediately, but has to be stored for a lengthy period of time, it is advisable to add 0.05–0.5% by wt.—preferably 0.1% by wt.—of a powdering agent, e.g. highly dispersed silicic acid. In that case the powder is again ground with the additive or intimately mixed therewith in another fashion.

d. Pigmented Varnish

By the described conventional methods a pulverulent varnish was prepared according to the following recipe:

Recipe 300 g. polyester according to 2b
180 g. masked isophorone diisocyanate according to 1a
136 g. white pigment, which is commercially available under the designation Kronos® RNCX and is TiO₂ of the rutile type, which is mixed with ZnO and was subjected to a post-treatment with Al and Si compounds as well as organic compounds
3.8 g. Troy Gla®  (see also 1d)
0.9 g. Irganox® 1076 (see also 1d)
if desired 0.5 g. highly dispersed silicic acid, which is commercially available under the designation Aerosil® 200.

The pigmented powder varnish was applied as described.

e. Mechanical Properties of the Varnish Films

Clear Varnish 2c

Stoving Conditions: 30' _____° C__ 180
Mechanical Properties:
    SD _____ 80–90
    HK _____ 173
    HB _____ 83
    ET _____ 11.4
    GS _____ 0

Pigmented Varnish 2d:

| Stoving conditions | Mechanical properties | | | | | |
|---|---|---|---|---|---|---|
|  | SD | HK | HB | ET | GS | Gl–45° |
| 30', 180° C | 55 | 197 | 111 | 7.8 | 0 | 93 |
| 30', 200° C | 50 | 186 | 125 | 9.3 | 0 | 91 |

EXAMPLE 3

This example is to illustrate that in order to achieve good mechanical properties it is not absolutely necessary that the varnish has to be cross-linked 100%.

a. Isocyanate Component

The isophorone diisocyanate crosslinked with caprolactam as described in Example 1 was utilized.

b. Polyester Component 5.63 moles (1,090 g.) of terephthalic acid dimethyl ester were reacted with 4.3 moles (577 g.) of trimethylol propane and 4.3 moles (690 g.) of trimethyl hexanediol-(1,6) with addition of 1.8 g. of tetraisopropyl titanate at a temperature rising up to 220° C. After no further methanol splitting off could be observed, the melt was cooled to 160° C. and 1.85 moles (359 g.) of terephthalic acid dimethylester were added. Reesterification was again carried out for approx. 8 hrs. at temperatures of up to a maximum of 235° C.

This polyester had the following chemical and physical data:

OH number _____ 150
Acid number _____ 1
Softening interval _____° C__ 48–50 c. Clear Varnishes

By the conventional methods of production clear varnish powders were prepared wherein the isocyanate and polyester components were utilized in different ratios of the NCO-groups to the OH-groups. The following ratios of NCO:OH group equivalents were selected: 0.5:1.0; 0.75:1.0, and 1.0:1.0.

$c_1$. Recipe for equivalent ratio 0.5:1.0

G.
Polyester 3b _____ 100
IPDI masked with ε-caprolactam _____ 30
Polyvinyl butyral _____ 0.55

$c_2$. Recipe for equivalent ratio 0.75:1.0

G.
Polyester 3b _____ 100
IPDI masked with ε-caprolactam _____ 45
Polyvinyl butyral _____ 0.60

$c_3$. Recipe for equivalent ratio 1.0:1.0

G.
Polyester 3b _____ 100
IPDI masked with ε-caprolactam _____ 60
Polyvinyl butyral _____ 0.65 d. Mechanical Properties of the Obtained Varnish Films

Equivalent ratio 0.5:1.0 (3c)

Stoving Conditions: 30' _____° C__ 180
Mechanical Properties:
    SD _____ 60
    HK _____ 205
    HB _____ 91
    ET _____ 3.1
    GS _____ 1

Equivalent ratio 0.75:1.0 ($3c_2$)

Stoving Conditions: 30' _____° C__ 180
Mechanical Properties:
    SD _____ 90
    HK _____ 197
    HB _____ 91
    ET _____ 8.9
    GS _____ 0

Equivalent ratio 1.0:1.0 ($3c_3$)

Stoving Conditions: 30' _____° C__ 180
Mechanical Properties:
    SD _____ 90
    HK _____ 187
    HB _____ 100
    ET _____ 9.7
    GS _____ 1

EXAMPLE 4

In powder coating it is not necessary to restrict oneself to masked monomeric diisocyanates, masked polyisocyanates, for instance of the type of the isocyanate urethane adducts, can also be used successfully.

a. Isocyanate Component $a_1$. Preparation of the trimethylol propane adduct of IPDI 3 moles of isphorone diisocyanate (667 g.) were supplied to a stirring flask together with 1.2 g. of di-n-butyl-tin dilaurate as catalyst. 141 g. of trimethylol propane (TMP) were dissolved in 434 g. of ethylglycol acetate at approx. 50° C. and maintained at approx. 50° C. in a heated bulb. (At lower temperatures the solubility is passed, and crystallization may take place. However, the system has a strong tendency towards the formation of supersaturated solutions.)

From the heated bulb approx. 20% of the TMP solution are continuously added per hour to the diisocyanate while stirring. Due to the crystallization danger the TMP solution had to flow directly into the heavily agitated reaction mixture. During the entire reaction the temperature of the reaction mixture ranged between 18 to 25° C. In order to remove the heat released during the urethane formation, the reaction mixture had to be cooled during the entire reaction period. After approx. 5 hours the components had combined completely in the reaction vessel. For approx. another 2 hours it was post-stirred at 20° C. to complete the reaction.

The 65% solution of this adduct in ethylglycol acetate had an isocyanate content of 9.35% NCO.

$a_2$. Blocking of the trimethylol propane adduct of IPDI with ε-caprolactam 800 g. of the solution of the trimethylol propane adduct of IPDI in ethylglycol acetate, 202 g. of ε-caprolactam and 448 g. of ethylglycol acetate were slowly heated to 100° C. After approx. 2 hours the temperature was raised to 120° C. After another hour the content in free isocyanate had dropped to approx. 0.3% so that the reaction could be interrupted. The solution of low viscosity was cooled to room temperature and the solid masked isocyanate adduct was precipitated with petroleum ether by grinding 300 g. of the solution with 1.5 ltr. of petroleum ether for several hours in a 3 ltr. ball mill. The fine, white powder could be easily separated by filtration. The adhering petroleum ether was removed from the substance in the oil pump vacuum. The powder had the following chemical and physical data:

Content in free isocyanate _____ Percent NCO__ 0.5
Content in blocked isocyanate _____ do____ approx. 10
Splitting temperature _____° C.__ approx. 180
Melting temperature _____° C__ 112–118 b. Polyester Component

The polyester described in example 2 consisting of terephthalic acid, phthalic acid, trimethylol propane and trimethyl hexanediol-(1,6) was employed as hydroxyl component.

c. Clear Varnish

A powder varnish was prepared in the manner described in example 1, homogenization taking place at temperatures between 150 and 160° C. because of the high melting point. The composition of the powder is evident from the following recipe:

|  | G. |
|---|---|
| Polyester (cf. example 2) | 100 |
| Masked IPDI-trimethylol propane adduct | 103 |
| Troy Gla® (see also 1d) | 1.8 |
| Irganox® 1076 (see also 1d) | 0.4 | d. Mechanical Data of the Varnish Films

| Stoving conditions | SD | HK | HB | ET | GS |
|---|---|---|---|---|---|
| 30′, 180° C | 70 | 188 | 111 | 4.1 | 0 |
| 30′, 200° C | 70–90 | 173 | 91 | 6.2 | 0 |

EXAMPLE 5 a. Isocyanate Component

The isophorone diisocyanate masked with ε-caprolactam as described in example 1 was used as cross-linking agent in this example too.

b. Polyester Component

The polyester in this example consists of terephthalic acid, 1,4-dimethylol cyclohexane, trimethylol propane and the 1:1 isomeric mixture of the 2,2,4/2,4,4-trimethyl hexanediol-(1,6).

Preparation 3 moles of terephthalic acid dimethyl ester (583 g.), 2 moles (288 g.) of 1,4-dimethylol cyclohexane, 1 mole (160 g.) of trimethyl hexanediol and 1 mole (134 g.) of trimethylol propane were reesterified with addition of 0.05% by wt. of tetraisopropyl titanate. The first splitting off of methanol occurred at 170–180° C. The methanol was removed from the reaction mixture with a nitrogen stream and condensed in the appropriate separator. In the course of 12 hours the temperature was raised from 180° C. to 230° C., the heating rate being adjusted to the splitting off of methanol. In the final phase of the reesterification another 0.05% by wt. of tetraisopropyl titanate were added.

In order to remove traces of volatile constituents, the batch was exposed to a vacuum of 1–2 torr for approx. 1 hour at 200° C.

After cooling off, the polyester is a solid resin which has the following characteristics:

OH-number _____ mg. KOH/g__ 155
Acid number _____ do____ <1
Melting point _____° C__ 57–59 c. Clear Varnish

As described in the preceding examples, a clear varnish was prepared according to the following recipe and cured.

Recipe

|  | G. |
|---|---|
| Polyester 5b | 100 |
| IPDI masked with caprolactam according to 1a | 61.8 |
| Polyvinyl butyral | 0.8 |
| Troy Gla® (see also 1d) | 0.8 |
| Irganox® 1076 (see also 1d) | 0.3 | d. Mechanical and Chemical Properties of the Varnish Films

| Stoving conditions | SD | HK | HB | ET | GS |
|---|---|---|---|---|---|
| 30′, 180° C | 70 | 177 | 111 | 9.8 | 0 |
| 30′, 200° C | 70 | 164 | 100 | 9.6 | 0 |

The films are characterized by excellent resistance to inorganic chemicals and organic solvents.

EXAMPLE 6 a. Isocyanate Component

The isocyanatourethane adduct blocked on both sides with ε-caprolactam and consisting of 1 mole of trimethyl hexanediol-(1,6) and 2 moles of isophorone diisocyanate was used as isocyanate component; it was prepared as follows:

12 moles (2.664 g.) of isophorone diisocyanate and 6 moles of trimethyl hexanediol-(1,6) were mixed in a suitable stirring flask and slowly heated to approx. 70° C. At this temperature the addition of the isocyanate onto the diol set in with considerable heat of reaction. During the addition the reaction vessel was cooled in an ice bath so that the temperature of the reaction mixture rose only to approx. 100° C. Subsequently it was post-heated for another 2 hours at 100° C. to complete the reaction. The NCO content was then 14.0% (theoretically: 13.9%).

Then the material was cooled to 80° C. and the stoichiometric quantity of ε-caprolactam corresponding to the isocyanate content was added. This reaction which is also exothermic raised the temperature to 105° C. The highly viscous melt was post-treated at 100° C. after 5 hours and then cooled to room temperature. The nearly colorless solid substance had a softening point of approx. 85° C. and a NCO content of 0.2%.

b. Polyester Component

The polyester utilized in this example consisted of terephthalic acid, 1,4-dimethylol cyclohexane, 2,2-dimethyl propanediol-(1,3) and of trimethylol propane and was prepared as follows:

9 moles (1.746 g.) of terephthalic acid dimethyl ester, 3 moles (432 g.) of dimethylol cyclohexane, 4.5 moles (468 g.) of 2,2-dimethyl propanediol-(1,3) and 3.5 moles (469 g.) of trimethylol propane were heated to 225° C. in 10 hours with addition of 1.5 g. of tetraisopropyl titanate. For the purpose of complete condensation it was reesterified for another 5 hours at approx. 235° C. Finally, volatile constituents were largely removed at 200° C. in the oil pump vacuum.

The solid polyester had the following chemical and physical data:

OH-number _____ mg. KOH/g__ 124
Acid number _____ mg. KOH/g__ <1
Softening interval _____° C__ 81–85 c. Pigmented Varnish

By the described conventional method a pulverulent varnish was prepared according to the following recipe:

Recipe

|  | G. |
|---|---|
| Polyester according to 6b | 400 |
| Masked isocyanatourethane adduct according to 6a | 366 |
| White pigment, Kronos RNCX® (see also 2d) | 133 |
| Irganox® 1076 (see also 1d) | 4.0 |
| Kunstharz AP® (synthetic ketone resin, synthetic aldehyde resin) | 16.0 |
| Silicone resin PO5 as flowing agent | 2.0 | d. Mechanical and Chemical Properties of the Varnish Films

| Stoving properties | Mechanical properties | | | | | |
|---|---|---|---|---|---|---|
|  | SD | HK | HB | ET | GL | GS |
| 30′, 180° C | 80 | 185 | 100 | 10.1 | 100 | 0 |
| 30′, 200° C | 70 | 178 | 100 | 10.1 | 98 | 0 |

RESISTANCE TO CHEMICALS.—REACTION AFTER 7 DAYS AT ROOM TEMPERATURE

| Reagent | 30′ at 180° C., cured | 30′ at 200° C., cured |
|---|---|---|
| 25% by wt. $H_2SO_4$ | Unchanged | Unchanged. |
| 10% by wt. NaOH | do | Do. |
| Toluene | do | Do. |
| Acetone | do | Do. |
| Methanol | Slightly swollen | Slightly swollen. |

What is claimed is:

1. Urethane forming particulate coating mass comprising epsilon-caprolactam blocked polyisocyanates comprising isophorone diisocyanate and aromatic polycarboxylic acid based polyesters containing hydroxyl groups, said polyesters being solid below 40° C., said coating mass having a grain size of 0.25 mm. or less and becoming fluid in the range of 150° C.–180° C. forming low viscosity melts.

2. Coating mass of claim 1 which includes conventional varnish additives, dyes and pigments.

3. Coating mass of claim 1 wherein said polyisocyanate is isophorone diisocyanate.

4. Coating mass of claim 1 wherein said polyester is formed from polyols selected from the group of ethylene glycol, propylene glycol, 2,2-dimethylpropane diol-(1,3), butane diols, hexane diols, 2,2,4-trimethylhexane diol-(1,6), 2,4,4-trimethylhexane diol-(1,6), heptane diol-(1,7), octadene-9, 10-diol-(1,12), thiodiglycol, octadecane diol-(1,18), 2,4-dimethyl-2-propylheptane diol-(1,3), butene diol-(1,4), diethylglycol, triethylglycol, trans-1,4-cyclohexanedimethanol, 1,4-cyclohexane diols, glycerine, hexane triol-(1,2,6), trimethylol propane, and mixtures of the foregoing.

5. Coating mass of claim 1 wherein said polyester is formed from aromatic polycarboxylic acids and optionally aliphatic and/or cycloaliphatic acids, said acids being selected from the group of oxalic acid, succinic acid, adipic acid, sebacic acid, terephthalic acid, methylterephthalic acid, 2,5- and 2,6-dimethylterephthalic acid, chloroterephthalic acid, 2,5-dichloroterephthalic acid, fluoroterephthalic acid, isophthalic acid, trimellitic acid, naphthalenedicarboxylic acid, phenylenediacetic acid, 4-carboxyphenoxyacetic acid m- and p-terphenyl-4,4″-dicarboxylic acid, dodecahydrodiphenic acid, hexahydroterephthalic acid, 4,4′-diphenic acid, 2,2′- and 3,3′-dimethyl-4,4′-diphenic acid, 2,2′-dibromo-4,4′-diphenic acid, bis-(4-carboxyphenyl)-methane, 1,1- and 1,2-bis-(4-carboxyphenoxy)-ethane, bis-4-carboxyphenyl ether, bis-(4-carboxyphenyl sulfide, bis-4-carboxyphenyl ketone, bis-4-carboxyphenyl sulfoxide, bis-4-carboxyphenyl sulfone, 2,8-dibenzofurandicarboxylic acid, 4,4′-stilbenedicarboxylic acid, octadecahydro-m-terphenyl-4,4″-dicarboxylic acid and esters and mixtures of the foregoing.

6. Coating mass of claim 1 wherein said polyisocyanate is an epsilon-caprolactam blocked adduct of isophorone diisocyanate and trimethylol propane.

7. Coating mass of claim 1 wherein said polyisocyanate is an epsilon-caprolactam blocked adduct of isophorone diisocyanate and a hexanediol.

References Cited

UNITED STATES PATENTS

| | | | |
|---|---|---|---|
| 2,993,813 | 7/1961 | Tischbein | 117—161 |
| 3,304,286 | 2/1967 | Altscher et al. | 260—47 |
| 3,583,943 | 6/1971 | Weber et al. | 260—75 |
| 3,676,402 | 7/1972 | Matsui et al. | 260—75 |
| 3,678,009 | 7/1972 | Lohse et al. | 260—75 |
| 3,310,533 | 3/1967 | McElroy | 260—75 NE |
| 3,352,830 | 11/1967 | Schmitt et al. | 260—77.5 AT |
| 3,668,186 | 6/1972 | Duncan et al. | 260—77.5 TB |
| 3,676,405 | 7/1972 | Labana | 260—77.5 TB |
| 3,694,389 | 9/1972 | Levy | 260—77.5 TB |

OTHER REFERENCES

DAS 1,089,153, Pleiger September 1960.

HERBERT S. COCKERMAN, Primary Examiner

U.S. Cl. X.R.

260—18 TN, 75 NK, 859